United States Patent
Tian et al.

(10) Patent No.: US 9,600,865 B2
(45) Date of Patent: Mar. 21, 2017

(54) METHOD FOR GRAPH BASED PROCESSING OF SIGNALS

(71) Applicant: Mitsubishi Electric Research Laboratories, Inc., Cambridge, MA (US)

(72) Inventors: Dong Tian, Boxborough, MA (US); Hassan Mansour, Boston, MA (US); Andrei Kniazev, Cambridge, MA (US); Anthony Vetro, Arlington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 288 days.

(21) Appl. No.: 14/269,527

(22) Filed: May 5, 2014

(65) Prior Publication Data

US 2015/0317808 A1 Nov. 5, 2015

(51) Int. Cl.
*G06T 5/00* (2006.01)
*G06T 11/20* (2006.01)

(52) U.S. Cl.
CPC .......... *G06T 5/002* (2013.01); *G06T 11/206* (2013.01); *G06T 2207/20072* (2013.01)

(58) Field of Classification Search
None
See application file for complete search history.

(56) References Cited

U.S. PATENT DOCUMENTS

| | | | | |
|---|---|---|---|---|
| 8,204,925 B2* | 6/2012 | Vrancic | ............... | G06F 17/12 703/2 |
| 8,755,429 B2* | 6/2014 | Hrycak | ............ | H04L 25/03114 375/233 |
| 8,965,282 B2* | 2/2015 | Barbotin | ............ | H04B 1/71637 375/130 |
| 2003/0009732 A1* | 1/2003 | Gullapalli | ........... | G06F 17/5036 716/113 |
| 2006/0039272 A1* | 2/2006 | Sikri | ................... | H04B 1/71635 370/208 |
| 2014/0369581 A1* | 12/2014 | Fu | ........................ | G06T 11/006 382/131 |

* cited by examiner

*Primary Examiner* — Michael D Yaary
(74) *Attorney, Agent, or Firm* — Gene Vinokur; James McAleenan; Hironori Tsukamoto (57) ABSTRACT

A method processes a signal by first constructing a graph from the signal, and then determining a graph matrix from the graph and the signal. A Krylov-based subspace is determined based on the graph matrix and the signal. A filter for the Krylov subspace is determined. The filter transforms the signal to produce a filtered signal, which is output.

20 Claims, 7 Drawing Sheets

METHOD FOR GRAPH BASED PROCESSING OF SIGNALS

FIELD OF THE INVENTION

This invention relates generally to signal processing, and more particularly to denoising 2D images or video, as well as 3D images or video.

BACKGROUND OF THE INVENTION

A wide range of applications in signal processing exhibits data that can be represented on vertices of graphs that describe a geometric structure of the data. These applications include social, energy, transportation and sensor networks, as well as synthetic and natural images, videos, and medical and hyper-spectral images.

One particular application is 3D video signal processing, where images often have different quality levels due to various acquisition and compression techniques applied to source signals. For example, changes of brightness or color can be produced by imaging sensors and circuitry of stereo cameras, or from shot noise. Conventional image enhancement techniques can be used to improve the quality of the images. Since depth map compression has become an integral part of 3D video formats, e.g., 3D-Advanced Video Coding (AVC) and 3D-High Efficiency Video Coding (HEVC), it is desirable to exploit depth information to enhance low quality images.

Graph signal processing tools have been used in conventional image processing applications. For example, a typical interpolation procedure uses a spectral graph, where an upsampling problem is formulated as a regularized least squares problem performed in the graph spectral domain. That approach has extended to depth image upsampling. A similar graph based method to enhance noisy stereo images uses depth information to generate a guide image. However, those methods suffer from high complexity due to the requirement of determining a full eigenvalue decomposition of very high dimensional data.

Another approach determines the graph spectral filter by means of a regularized, least squares problem with a regularization parameter. This approach has a disadvantage that the outcome of the filtering is highly sensitive to the choice of the regularization parameter.

An alternative approach, which avoids full eigendecompositions, uses a graph spectral filter approximated by polynomials. The filtering operation is performed by applying the polynomial as a function of a graph Laplacian matrix in the pixel domain. That approach restricts the filtering process to a predetermined fixed function, which may not be the best suitable for a variety of given signals.

Basics of Signals on Graphs

In graph signal processing, an undirected graph G=(V, E) includes a set of vertices, also called nodes, V={1, 2, ..., N} connected by a set of edges E={(i, j, $w_{ij}$)}, i, j∈V, where (i,j, $w_{ij}$) denotes an edge between nodes i and j associated with a weight $w_{ij}$≥0. A degree $d_i$ of a node i is a sum of edge weights connected to the node i.

An adjacency matrix W of the graph is a symmetric N×N matrix having entries $w_{ij}$≥0, and a diagonal degree matrix is D:=diag{$d_1$, $d_2$, ..., $d_N$}. A graph Laplacian matrix L:=D−W is a positive semi-definite matrix, thus admitting an eigendecomposition L=UΛ$U^T$, where U is an orthogonal matrix with columns forming an orthonormal set of eigenvectors, and Λ=diag{$\lambda_1$, ..., $\lambda_N$} is a matrix made of corresponding eigenvalues all real.

The eigenvalues and eigenvectors of the Laplacian matrixes provide a spectral interpretation of graph signals, where the eigenvalues can be treated as graph Fourier frequencies, and the eigenvectors as generalized. Fourier modes.

A graph can be associated with an underlying image filter, conventionally used as one of the filter testing benchmarks. Specifically, for an input image $\hat{x}_{in}$ the conventionally filtered output image $\hat{x}_{out}$ can be written as, $$\hat{x}_{out} D^{-1} W \hat{x}_{in} = \hat{x}_{in} - D^{-1} L \hat{x}_{in}. \quad (1)$$

Graph Spectral Filtering (GSF) $\mathcal{H}$ can be designed for image processing purposes in the graph spectral domain, where $\mathcal{H}$ is a diagonal matrix, typically given as $\mathcal{H}$ =h(Λ), where h(λ) is a real valued function of a real variable λ, determining the filter. The corresponding graph filter H in the vertex domain can be expressed as, $$H=h(L)=U \mathcal{H} U^T. \quad (2)$$

Basics of Graph Based Image Processing

Figure 1A:
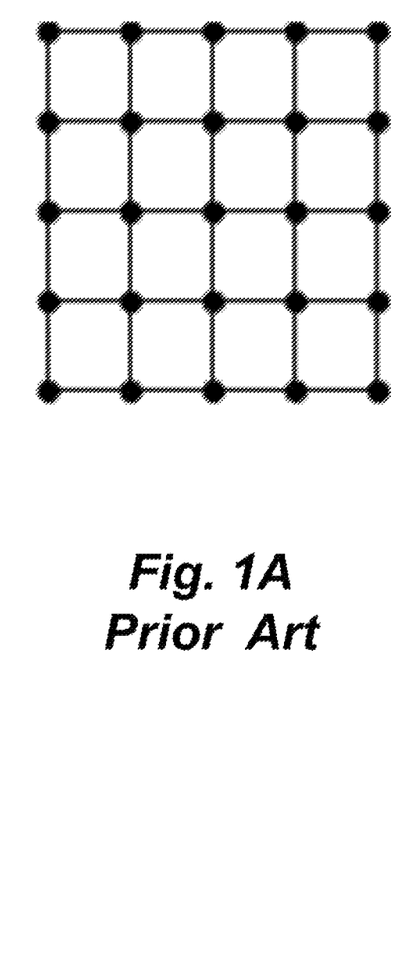
FIG. 1A is a conventional 4-connected simple graph constructed from an image.

For image processing applications, a pixel in an image can be treated as a node in a graph, while weights on edges connecting the nodes represent a measure of similarity of the pixels connected by the edges. As shown in FIG. 1A, in the context of graph based image processing, the vertices of the graph correspond to pixels in the image. FIG. 1A, shows a 4-connected simple graph that is defined before setting and applying graph based approaches for image denoising. Each pixel is connected only to its font immediate neighbors in, the image plane. All pixels within the image, or an image slice, share a single graph and are be processed within one graph spectral domain.

After the connection structure in the graph is defined, a weight is assigned for each graph edge. One approach is to assign bilateral weights, where the weights $w_{ij}$ are defined by $$w_{ij} = \exp\left(-\frac{\|p_i - p_j\|^2}{2\sigma_s^2}\right)\exp\left(-\frac{(x_{in}[i] - x_{in}[j])^2}{2\sigma_r^2}\right). \quad (3)$$

The first exponential term is a spatial distance penalty, where $p_i$ refers to the pixel spatial location, and the second exponential term is an intensity distance penalty, where $x_{in}$ refers to an intensity value.

SUMMARY OF THE INVENTION

The embodiments of the invention provide a method for processing a signal, for example a 2D or 3D image or video, in a graph spectral domain by computing a mapping, of the signal onto a graph subspace, The method constructs a graph from the signal, and then determines a graph matrix from the graph that defines the Fourier spectral properties of the graph. The method then determines a low dimensional subspace based on the graph matrix, and a filter that filters the signal to the subspace. A filtering of the signal to the subspace using the filter produces the filtered signal, which is the output signal.

One embodiment determines the graph matrix based on one or a combination of graph adjacency (W), random walk ($D^{-1}$ W) and Laplacian matrix (L), and wherein entries of the graph matrix are determined by weights of edges of the graph. The graph Laplacian matrix L can be substituted with, for example, normalized $D^{-1}$ L or symmetrically normalized $D^{-1/2}$ L $D^{-1/2}$ Laplacian, according to some embodiments of the invention.

In one embodiment, the subspace, denoted by $\mathcal{K}$, is determined as a Krylov-based subspace, selected from the group consisting of a Krylov subspace, an approximate Krylov subspace, a rational Krylov subspace, an approximate rational Krylov subspace and combinations thereof.

The filter, denoted by $P^{\mathcal{K}}$, can be a function of the graph matrix, for example, h(L). Alternatively, according to some embodiments of the invention, the filter can be an approximate function of the graph matrix, for example, if the exact function of the graph matrix is given by h(L), the approximate matrix function can be h($\mathbf{\tilde{L}}$), where the matrix $\mathbf{\tilde{L}}$ is an approximation of the matrix L, for example, a reduced accuracy representation of L, while the function h( ) remains the same.

In one particular embodiment, the subspace $\mathcal{K}$ is defined as a Krylov subspace of a graph Laplacian, which is advantageous because it allows us to determine a polynomial-based filter.

The filter can for example, be determined using a matrix polynomial that optimally suppresses graph Fourier spectral components of the signal on an interval, while emphasizing the graph Fourier spectral components outside of the interval.

In one embodiment, the polynomial is a Chebyshev polynomial with a predefined stop band that optimally and uniformly suppresses graph Fourier spectral components of the signal above the band, while emphasizing the graph Fourier spectral components below the band.

In a similar embodiment, the polynomial is a combination of polynomials suppressing graph Fourier spectral components of the signal on one or more non-interlacing intervals, while emphasizing the graph spectral components outside of the one or more non-interlacing intervals. For example, the polynomial can be a product of Chebyshev polynomials on corresponding intervals. In another example, the polynomial can be determined that optimally and uniformly suppresses graph Fourier spectral components of the signal on one or more non-interlacing intervals, while emphasizing the graph spectral components outside of the one or more non-interlacing intervals.

One embodiment determines the filter based on a two-term Chebyshev iterative method using roots of Chebyshev polynomials. Another embodiment utilizes recursive formulas for the Chebyshev polynomials, leading, for example, to a three-term Chebyshev iterative method.

In a different embodiment, the polynomial is adaptive to the signal, wherein adaptive means that the polynomial coefficients or roots are determined dependently on the signal. In one embodiment, an example of the adaptive polynomial is a parameter free adaptive filtering approach that use iterations of a conjugate gradient (CG) procedure. The CG adaptive filter can be viewed as an example of a Krylov subspace polynomial approximation of an embodiment, where the matrix rational function is based on an inverse of the graph matrix, or on a pseudo inverse, if the graph matrix is singular.

Alternatively, or additionally, the function of the graph matrix can be based on an iterative method solving a partial eigenvalue problem for the graph matrix, wherein the partial eigenvalue problem is a problem of computing a part of eigenvalues, and the number of iterations of the iterative method is determined by a threshold. This embodiment is based on realization that limiting the number of iterations of the iterative method solving a partial eigenvalue problem allows the user to control both the filter quality and the computational costs. For example, for the purpose of low pass filtering, one can target the low band in the spectrum. If the number of iterations is too large, then the filter method not only is computationally expensive, but also restricts the filtering specifically to the selected target, decreasing the filter quality.

Examples of iterative methods solving a partial eigenvalue problem include Krylov subspace and rational Krylov subspace methods. In one embodiment, the Krylov subspace methods are, for example, the Lanczos or the conjugate gradient methods, both serving as other examples of Krylov subspace polynomial adaptive filters, wherein the roots and the coefficients of polynomials adapt to the signal.

Several embodiment propose adaptive filters, using adaptive matrix factions, and adaptive polynomials, based on realization that the adaptively is advantageous because it allows the filter to perform signal filtering for a wide variety of signals with different spectral distributions, automatically adapting the filter quality for every given signal.

In another embodiment, the signal is a noisy image from a stereo or multiview set of images, with auxiliary information in the form of a depth map and a second image capturing a different perspective of the signal. The depth map can be used to warp the second image to match the perspective of the noisy image.

The method constructs a graph from the warped second image and computes a graph Laplacian matrix. Image denoising, can be realized by low-pass filtering. The method performs graph-based filtering of a noisy image by directly determining a projection of the image to be filtered onto a lower dimensional Krylov subspace of a graph Laplacian using, for example, the Chebyshev and CG filters defined in the previous embodiment.

The proposed method produces subjectively cleaner images with about 1-3 dB improvement in the peak signal-to-noise ratio over existing polynomial graph filters.

DETAILED DESCRIPTION OF THE EMBODIMENTS

Figure 2:
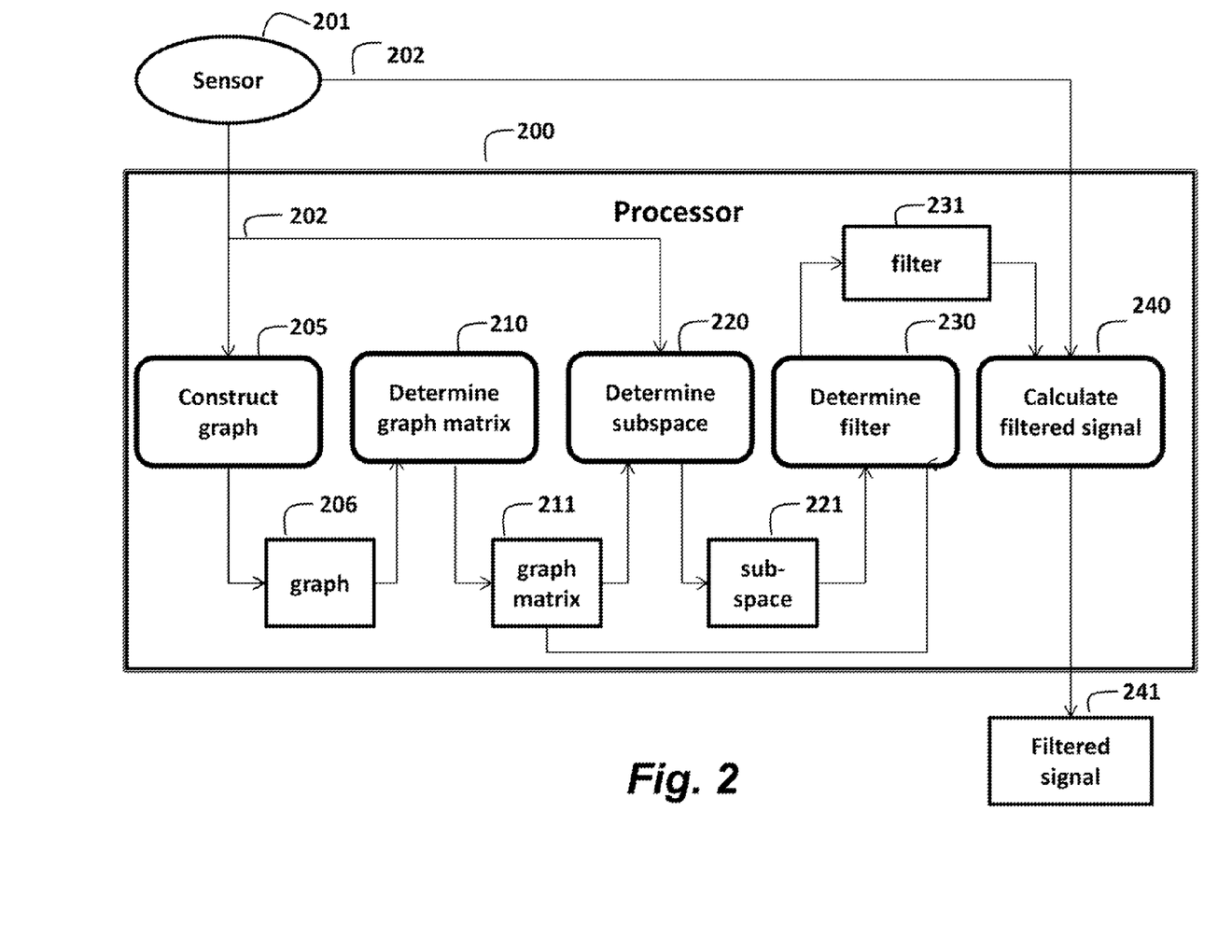
FIG. 2 is a flow diagram of a method for processing a signal according to embodiments of the invention.

FIG. 2 shows a flow chart of a method for processing a signal 202. The signal 202 can be acquired by a sensor 201. For example, the sensor is a camera or a 3D video camera. Alternatively, the signal is stored in a memory. Typically, the signal is in the form of digital (binary) data. A graph 206 is constructed 205 from the signal. A graph matrix 211 is determined 210 from the graph. A subspace 221 is determined 220 based on the graph matrix and the signal. A filter 231 to the subspace is determined 230. The filter 213 is a map that maps 240 the signal 202 to the subspace 221 producing the filtered out signal 241.

Figure 3:
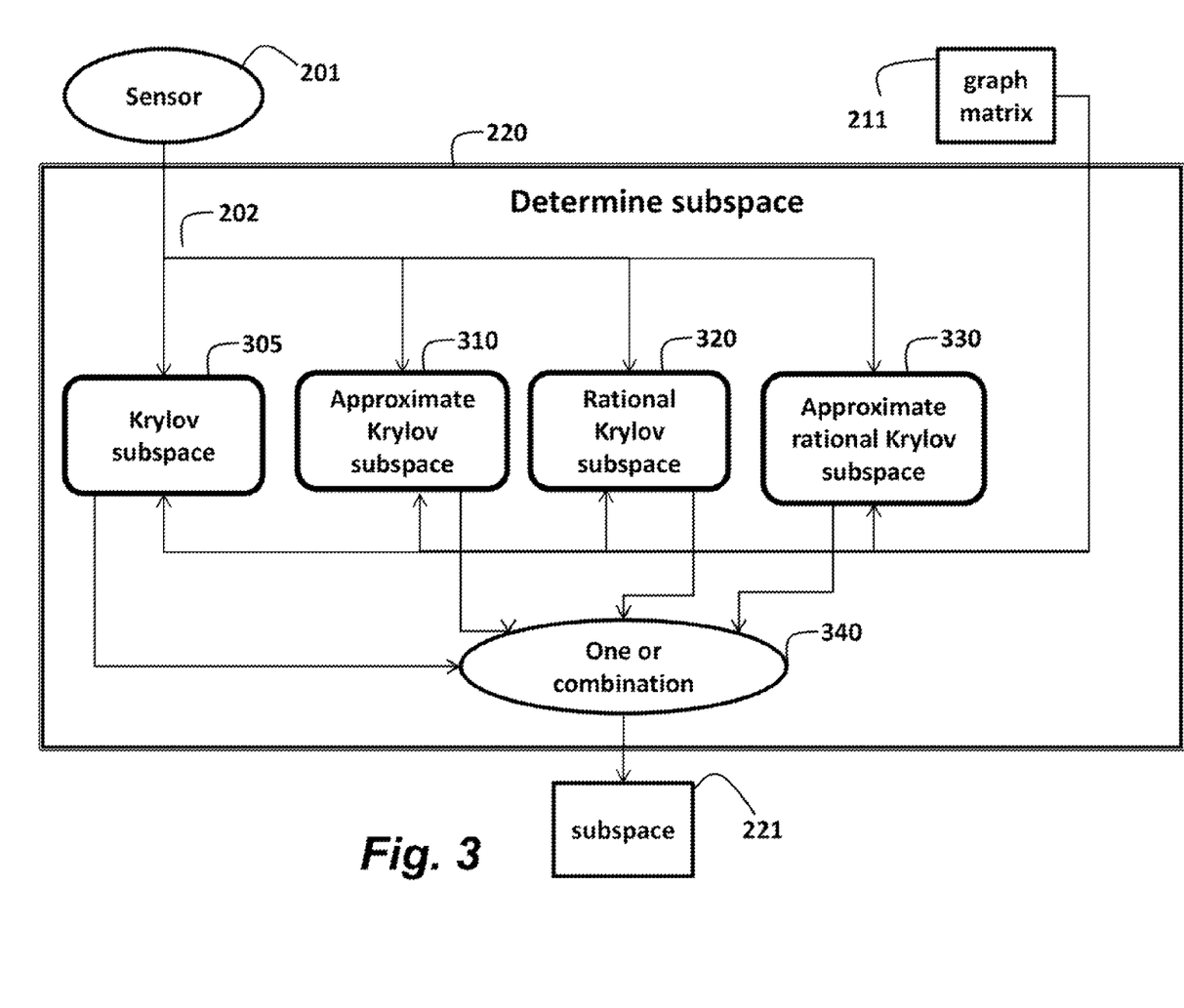
FIG. 3 is a flow diagram of a method for determining a subspace according to embodiments of the invention.

FIG. 3 shows a flow chart for determining 220 the subspace from a group consisting of a Krylov subspace 305, an approximate Krylov subspace 310, a rational Krylov subspace 320, an approximate rational Krylov subspace 330, and combinations 340 thereof.

Figure 4:
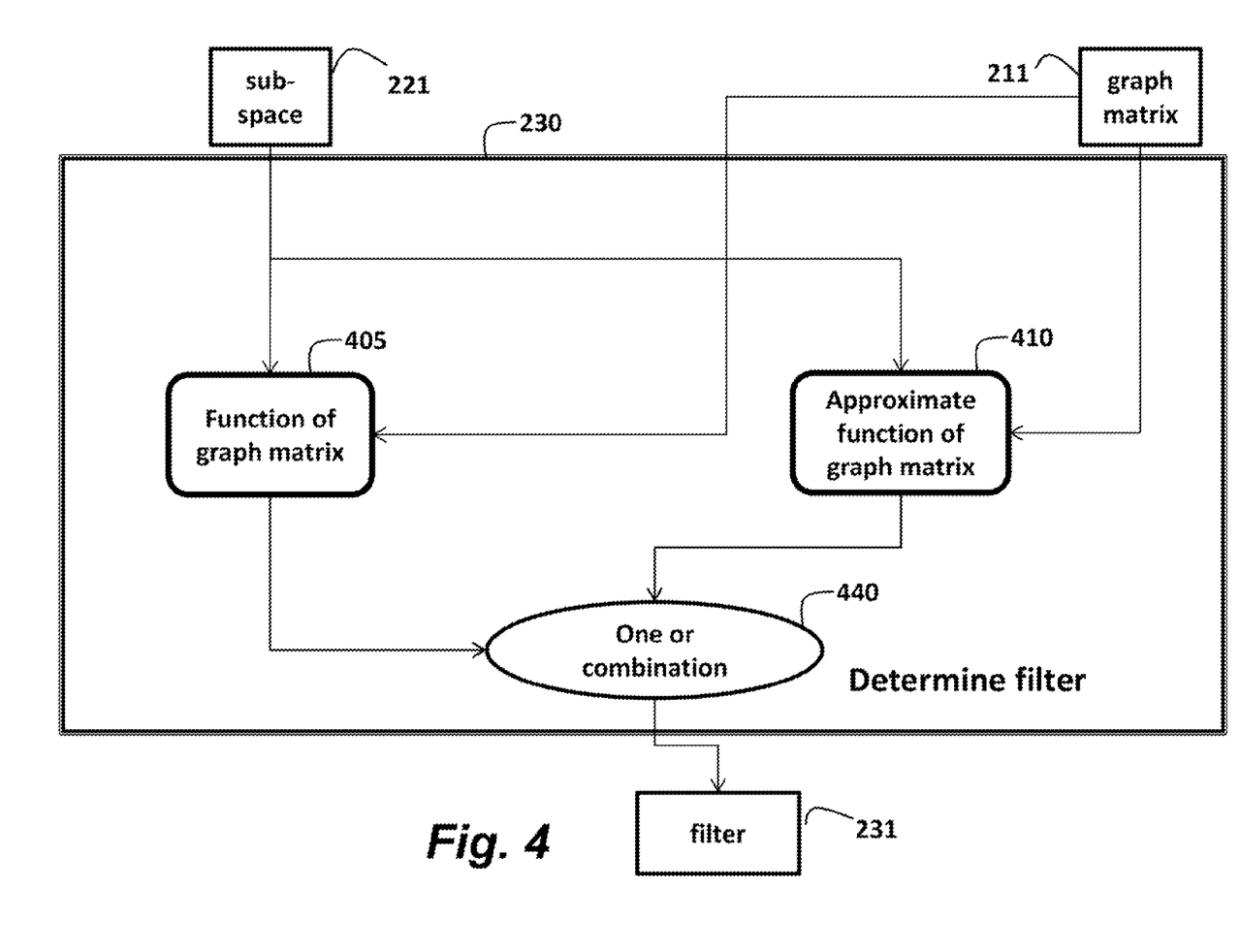
FIG. 4 is a flow diagram of a method for determining a filter according to embodiments of the invention.

FIG. 4 shows a flow chart for determining 230 the filter 231 from a group consisting of a function 405 of the graph matrix and an approximate function 410 of the graph matrix, or their combination 440, based on subspace 221 and graph matrix 211.

Figure 5A:
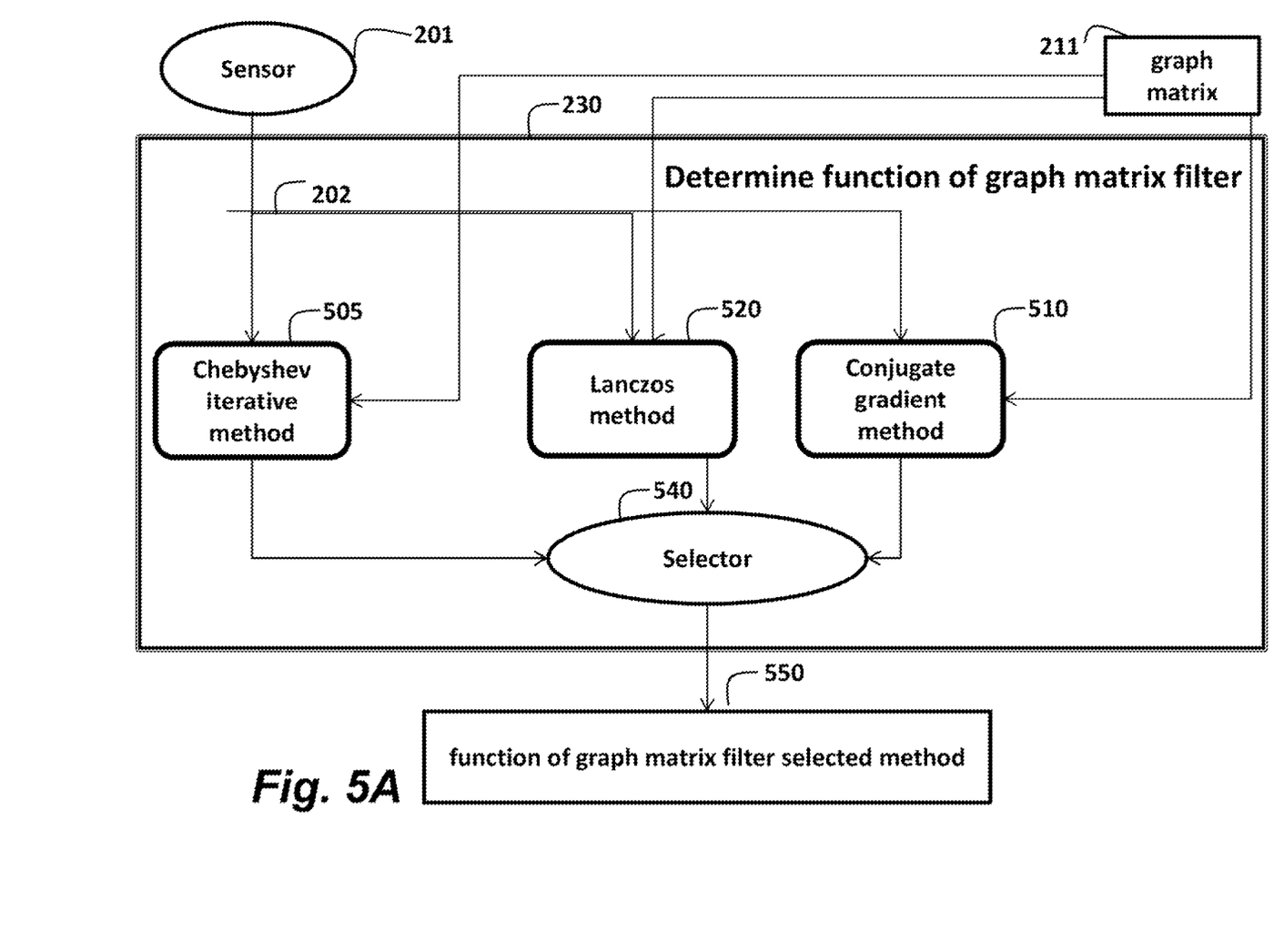
FIG. 5A is a flow diagram of a method for determining a function of graph matrix filter according to embodiments of the invention.

FIG. 5A shows a flow chart for several embodiments illustrating examples of selection 540 choices of the filter method 230 as a function 405 of the graph matrix. In one embodiment, an iterative Chebyshev method 505 is applied to filter the signal to the subspace. In another embodiment, a conjugate gradient method 510 is employed to perform the filtering. In a different embodiment the function of graph matrix filter 405 can be selected 550 as a Lanczos method 520.

Figure 5B:
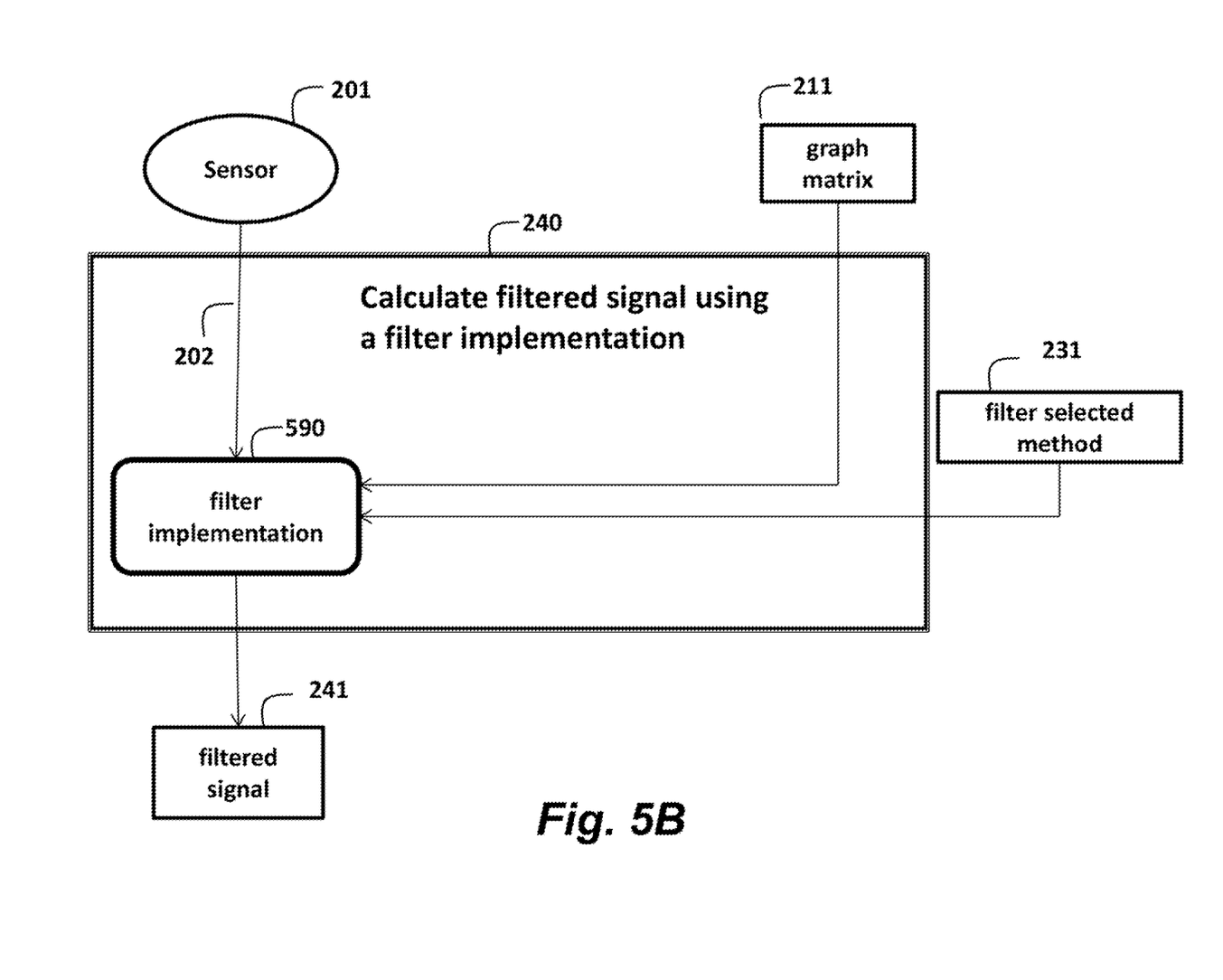
FIG. 5B is a flow diagram of a method for calculating a filtered signal according to embodiments of the invention.

FIG. 5B illustrates how a selected filter 231 method, such as 550, can be used to calculate a filtered signal 241 using a filter implementation 590, wherein the filter implementation can be done as a computer code or pre-programmed into a computing device.

The steps, for example, the filter implementation 590, can be performed in a processor connected to memory and input/output interfaces by buses as known in the art. The processor can, for example, be a multi-core processor, a parallel processor, field-programmable gate array (FPGA), or a graphics processing unit (GPU).

We further describe embodiments of the invention in more details below.

Graph Filtering via Subspace Mapping

The graph filtering problem can be viewed in the context of a general task of applying a function h(L) 405 of the graph Laplacian matrix L 211 to the input signal $x_{in}$ thereafter for brevity denoted by b 202, such that, $$x^* = h(L)b \quad (4).$$

For image denoising, the goal is to suppress high frequency noise, in which case the graph filter h(L) is a low pass filter.

For general functions h(L), the problem becomes intractable to exactly compute the action of h(L) on b via the eigendecomposition of L when the dimensionally of b is large. To overcome this difficulty, we set up and evaluate the projection of $x^*$ onto an appropriate low dimensional subspace $\mathcal{K}$. Denoting by $\mathcal{\tilde K}$ the mapping onto the subspace $\mathcal{K}$ 221. Which represents a subspace filter, the projection $\mathcal{\tilde K}$ of the solution $x^*$ of equation (4) in the subspace $\mathcal{K}$ is $$\mathcal{\tilde K} = \mathcal{\tilde K} h(L) b. \quad (5)$$

For example, if we are interested in low-pass filters, then we can use the Krylov subspace projection technique, i.e., we approximate the solution $x^*$ by a vector in the order-(k+1) Krylov subspace 305.

$$K = \mathrm{span}\{b, Lb, \ldots, L^k b\}. \quad (6)$$

The Krylov subspace can approximate eigenvectors corresponding to extreme eigenvalues, thus it is an appropriate choice for high- and low-pass filters. Here we use $h(\mathcal{\tilde K} L \mathcal{\tilde K})$ as the only practically available, within the constraints of polynomial filtering, replacement for $\mathcal{\tilde K} h(L)$. Moreover, the Krylov subspace in equations (6) is constructed starting with the initial image $x_{in}=b$, therefore it only takes into account the L-spectral modes actually present in the image.

An implementation of a filter using the degree k Krylov subspace can be especially simple if the filter function h(·) itself is a polynomial of degree k or smaller, $h(\lambda) = \mathcal{H}(\lambda)$, because $\mathcal{H} = \mathbf{P}_\mathcal{K} \, p_k(L) b = \mathcal{H}(L) b$, where the equality holds because the subspace $\mathcal{H}$ contains all possible vectors $p_k(L)b$ for any polynomial $p_k(\cdot)$ of degree k or smaller, i.e., $\mathcal{H}(L)b \in \mathbf{P}_\mathcal{K}$. Computational gain is achieved when the matrix L is sparse and the degree k is small.

The filter can also be constructed based on rational Krylov subspaces 320 and their approximations 330. A rational Krylov subspace $K_r$ defined as $$Kr = \mathrm{span}\{(L-s_1 I)^{-1} b, \ldots, \Pi_j (L-s_j I)^{-b} b\},$$

estimates interior, as opposed to extreme, eigenvalues thereby allowing for the design of band pass and band reject filters.

Chebyshev Polynomial Graph Spectral Denoising

Restricting ourselves to polynomial filtering, due to computational considerations, we can set up a problem of designing optimal polynomial low pass filters.

Our first example of an optimal polynomial low pass filter is based on Chebyshev polynomials. Specifically, we use a degree k Chebyshev polynomial $h_{k\text{-}CHEB}$ 505 defined over the interval [0, 2] with a stop band extending from $l \in (0,2)$ to 2. Because we define the graph spectrum in terms of the eigenspace of the symmetric normalized Laplacian L in this example, all the eigenvalues of L lie in the interval [0,2]. The construction of a Chebyshev polynomial can, for example, be obtained by determining the roots of the degree k Chebyshev polynomial $\hat r(i) = \cos(\pi(2i-1)/2k)$ for $i=1 \ldots k$, over the interval $[-1,1]$, then shifting the roots to the interval $[1,2]$ via linear transformation to obtain the roots $r_i$ of the polynomial $h_{k\text{-}CHEB}$, and then scaling the polynomial using $r_0$ such that $h_{k\text{-}CHEB}(0)=1$. This results in formula $$h_{k\text{-}CHEB}(\lambda) = p_k(\lambda) = \prod_{i=1}^{k}\left(1-\frac{\lambda}{r_i}\right) = r_0 \prod_{i=1}^{k}(r_i - \lambda);$$

and we can compute $x^*_K$ by evaluating $x^i = r_i x^{i-1} - L x^{i-1}$ iteratively for $i=1, \ldots, k$, where $x^0 = r_0 b$.

More general filters can be constructed using products of Chebyshev polynomials. For example, a band pass filter $h_{BP}(\lambda)$ can be achieved by first constructing a high pass Chebyshev filter $h_{HP}(\lambda)$ with roots in the interval $[0, 1_1]$ and a second Chebyshev polynomial $h_{LP}(\lambda)$ with roots in the interval $[1_2, 2]$, with $h_{HP}(0)=h_{LP}(0)=1$ and $1_1 < 1_2$. The band pass filter is then obtained by setting $h_{BP}(\lambda) = h_{HP}(\lambda) h_{LPL}(\lambda)$.

Chebyshev polynomials are minimax optimal, uniformly suppressing all spectral components on the interval [1,2] and increasing faster than any other polynomial outside of [1,2]. The stop band frequency l remains a design parameter that needs to be set prior to filtering. In the next subsection, we describe a variational parameter-free method as an example of an adaptive filter.

Conjugate Gradient C) Method for Krylov Denoising

Because L is a high-pass filter, its Moore-Penrose pseudo inverse $L^\dagger$ is a low-pass filter, so can we design a low-pass graph spectral filter by selecting $h(L)=L^\dagger$, i.e., setting $x^*=L^\dagger b$.

We use the subspace projection technique, formulating the graph filtering problem as a constrained quadratic program, $$x_{\tilde{K}}^* = \underset{x \in \tilde{K}}{\arg\min} x^T L x - 2x^T f, \quad (7)$$

$$\tilde{K} = x^0 + \mathrm{span}\{f - Lx^0, \ldots, L^k(f - Lx^0)\},$$

where the initial approximation $x^0$ and the vector f remain to be chosen. The solution to the problem in equation (7) can be computed by running k iterations of the CG method 510. We denote by $h_{k-CG}$ the k-step CG filter with $x^0=f=b$, in which case $\tilde{K} \subseteq \mathcal{K}$ ... the order-(k+1) Krylov subspace defined in equation (6). We denote by $h_{k-CG0}$ the k-step CG filter with $x^0=b$ and $f=0$. Yet another choice, e.g., $x^0=0$ and $f=b$, results in $\tilde{K}$ equal to the order-k Krylov subspace span$\{b, Lb, \ldots, L^{-1}b\}$ The CG procedure is advantageous because it adaptively adjusts the spectral response based on the input signal.

Graph Based 3D Image Processing

Figure 1B:
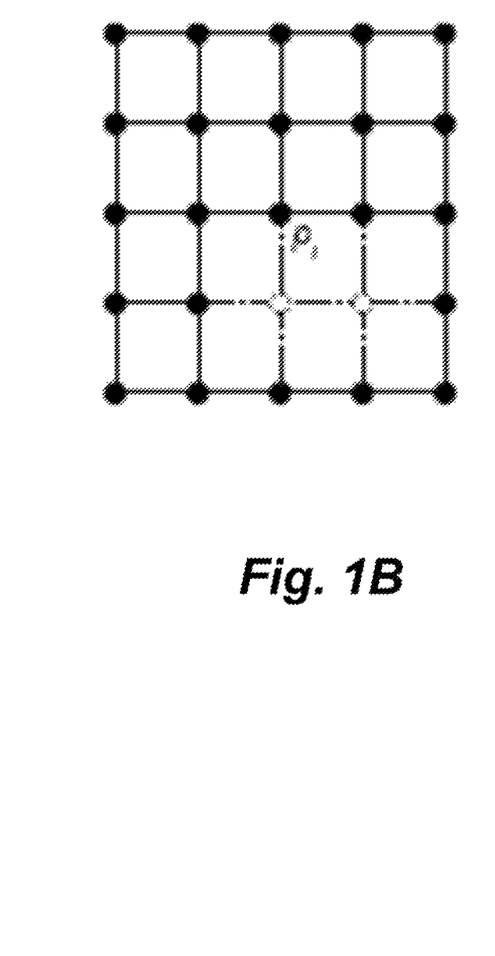
FIG. 1B is the graph to handle 3D image denoising with help from depth information according to embodiments of the invention.

FIG. 1B shows the proposed graph to handle 3D image denoising with help from side information available in the form of a depth map and an alternate second view. In FIG. 1B, $p_i$ represents a pixel, and the dashed lines represent missing links to that pixel due to a hole. A hole is a pixel in the first view that cannot be generated from the second view and the depth map to match the perspective of first view due to an occlusion in the second view. After the connection structure, in the graph is defined, a weight is assigned for each graph edge. One approach assigns the weights $w_{ij}$, for example, as bilateral weights, following formula (3), or as joint bilateral weights.

Figure 6:
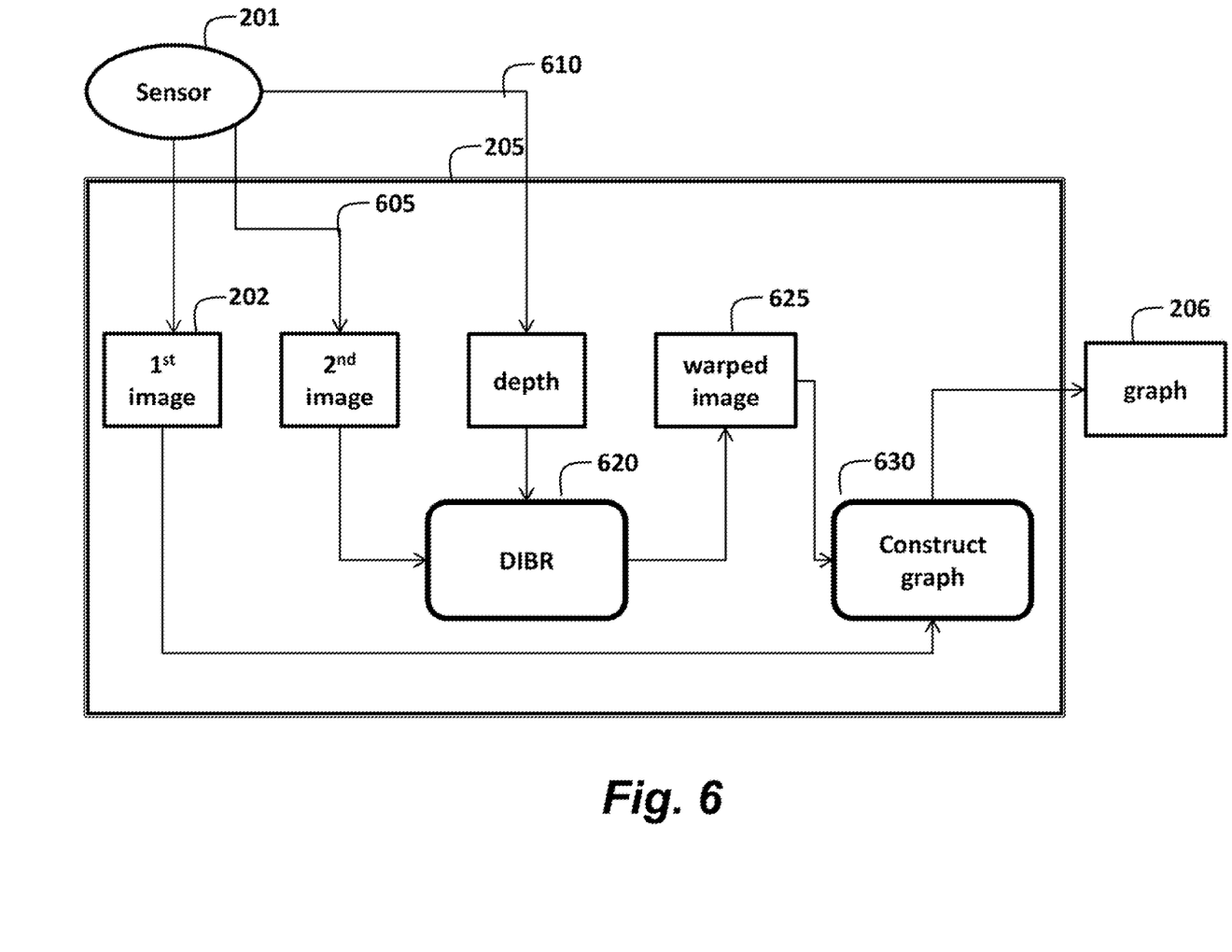
FIG. 6 is a flow diagram of a method to construct the graph to handle 3D image denoising using depth information according to embodiments of the invent ion.

The construction of the graph 206 is depicted by FIG. 6 where the depth signal and a second image are utilized to construct the graph. Note that the block diagram in FIG. 6 can be an implementation of the "Construct graph" block 205 in FIG. 2 in case of 3D image denoising.

The signal from the sensor 201 can be composed of three parts: $1^{st}$ image 202, 2 image 605, and depth information 610. The $1^{st}$ image 202 can be to be processed with one embodiment as proposed in the invention; while the $2^{nd}$ image 605 and depth information 610 can be used to help the construction of the graph structure. The $2^{nd}$ image is at a different viewpoint than the $1^{st}$ image. A depth image based rendering (DIBR) process 620 takes the $2^{nd}$ image 605 and depth information 610 as input with a warped image 625 as output. Finally, the warped image 625 and the $1^{st}$ image 202 can be used to construct 630 graph 206.

The weights of the edges can be defined as in formula (3) with a guided image being the warped image 625. A conventional depth image based rendering (DIBR) process can be used to generate the warped/guidance image is described below.

For each pixel location $i=[u, v]$ in a current image, a corresponding location $i'=[u', v']$ can be determined based on camera parameters and a pin hole camera model. Hence, $x_{in}(i)$ in the warped image is obtained from $x_{in}'(i')$ in a high quality image. Although [u, v] is always at a pixel at integer an location, [u', v'] can point to a subpixel location. As a result, subpixel interpolation in the high quality image needs be performed to maintain accuracy. For example, we can use the 8- or 7-tap interpolation filter defined in H.265/HEVC video coding standard.

Furthermore, occlusions can occur near foreground objects during the warping process. The occlusions are marked as hole areas. A typical hole filling procedure would propagate the background pixels into the holes using inpainting techniques. Because the filled holes are often unreliable, in one example, we do not use the filled pixels as guidance to construct the graph. Instead, we avoid any links to or from a hole pixel. As shown in FIG. 1B, as there is a hole pixel below pixel p there are three links left for this pixel. In such a way, the proposed graph filtering operation is only performed on non-hole pixels while any conventional filtering is performed on hole pixels.

Patch-Based Processing

To reduce memory requirements, we can use patches of the image that are filtered independently. Moreover, the patch based approach is favorable for parallel implementation and can be synchronized with the coding unit structures used in a typical video coding framework, such as H.265/HEVC. The polynomial degree k tends to increase with larger patch sizes. Using the patching may introduce unwanted artificial visual blocking in the filtered signal at the common boundaries of the patches due to inconsistent signal normalization on different patches. To avoid such blocking, one embodiment introduces a post-processing normalization step. For example, the post-processing normalization step may be based on a projection of the original noisy signal to the one-dimensional subspace spanned by the filtered output signal on every patch. This projection is advantageous because it is computationally inexpensive, fully automatic with no parameters to adjust, and removes the blocking.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for processing an image signal by an input interface in communication with a non-transitory computer readable storage medium embodied thereon a program executable by a processor for performing the method, comprising:

constructing, by the processor in communication with the input interface, a graph from the image signal, wherein the image signal is acquired by at least one sensor;

determining, by the processor, a graph matrix from the graph and the image signal by adjusting a magnitude of a corresponding graph frequency components;

determining, by the processor, a Krylov-based subspace based on the graph matrix and the image signal;

determining, by the processor, a filter for the Krylov-based subspace, wherein the filter transforms the image signal to produce a filtered image signal; and outputting the filtered image signal via an output interface in communication with the processor, wherein noise in the filtered image signal is less than noise in the image signal and provides for improved signal processing.

2. The method of claim 1, wherein the Krylov-based subspace is selected from the group consisting of an approximate Krylov subspace, a rational Krylov subspace, an approximate rational Krylov subspace, and combinations thereof.

3. The method of claim 1, wherein the filter is selected from the group consisting of a function of the graph matrix and an approximate function of the graph matrix.

4. The method of claim 3, wherein the function of the graph matrix is selected from the group consisting of a matrix polynomial, an approximate matrix polynomial, a matrix rational function, an approximate matrix rational function, and combinations thereof.

5. The method of claim 4, wherein the matrix polynomial optimally suppresses graph Fourier spectral components of the image signal on an interval, while emphasizing the graph Fourier spectral components outside of the interval.

6. The method of claim 4, wherein the matrix polynomial is a combination of polynomials suppressing graph Fourier spectral components of the image signal on one or more non-interlacing intervals, while emphasizing the graph spectral components outside of the one or more non-interlacing intervals.

7. The method of claim 3 further comprising:
determining the filter based on a Chebyshev iterative method using one or a combination of roots of Chebyshev polynomials and recursive formulas for the Chebyshev polynomials.

8. The method of claim 4, wherein the matrix rational function is based on an inverse of the graph matrix.

9. The method of claim 1, further comprising:
determining the filter based on a Krylov subspace iterative method.

10. The method of claim 9, further comprising:
determining the Krylov subspace iterative method based on a conjugate gradient iterative method.

11. The method of claim 3, wherein the function of the graph matrix is based on an iterative method solving a partial eigenvalue problem for the graph matrix, and wherein the partial eigenvalue problem is a problem of computing a part of eigenvalues, and the number of iterations of the iterative method is determined by a threshold.

12. The method of claim 11, wherein the iterative method is based on one or a combination of a Krylov subspace and a rational Krylov subspace iterative methods.

13. The method of claim 12, wherein the Krylov subspace iterative method is based on one or a combination of the Lanczos and conjugate gradient methods.

14. The method of claim 1, wherein the graph matrix is based on one or a combination of graph adjacency, random walk, and Laplacian matrix, and wherein entries of the graph matrix are determined by weights of edges of the graph.

15. The method of claim 1, wherein the filter is adaptive to the image signal and the filter is a low pass filter.

16. The method of claim 3, wherein the function is adaptive to the image signal.

17. The method of claim 5, wherein the polynomial is adaptive to the image signal.

18. The method of claim 1, wherein the image signal is selected from the group consisting of an image, a patch in an image, a set of images, a video sequence, a patch in a video sequence, a depth map, and a patch of depth map and combinations thereof, and wherein the graph includes nodes and edges, and further comprising:
determining graph vertices to represent the image signal on individual or groups of image pixels or video voxels; and
determining weights of edges of the graph using the image signal.

19. The method of claim 1, wherein the image signal is determined by a first image signal selected from the group consisting of an image, a patch in an image, a set of images, a video sequence, and a patch in a video sequence and combinations thereof, and wherein the graph includes nodes and edges, and further comprising:
accessing a depth signal and a second image signal selected from the group of a second set of images, a second video sequence, and a patch in the second video sequence;
warping the second image signal to a viewpoint of the first image signal using depth image based rendering;
determining weights of edges of the graph using the warped image signal.

20. The method of claim 1, wherein the image signal is noisy having a first distortion, and the filtered image signal has a second distortion, such that the second distortion of the filtered image signal is less than the first distortion of the image signal.

* * * * *